March 22, 1949.  E. E. ARNOLD  2,464,960
FLUID OPERATED BRAKE
Filed July 24, 1946  2 Sheets-Sheet 1
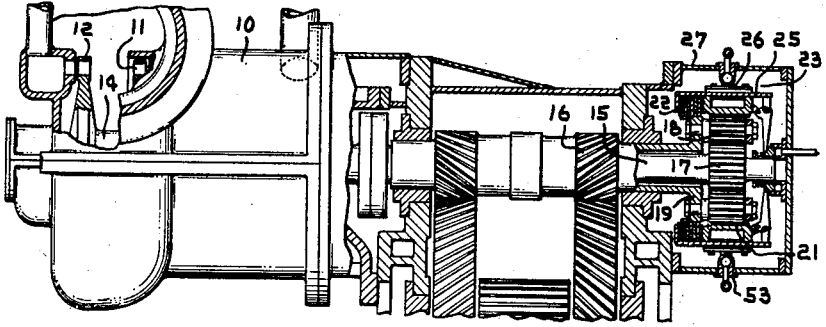
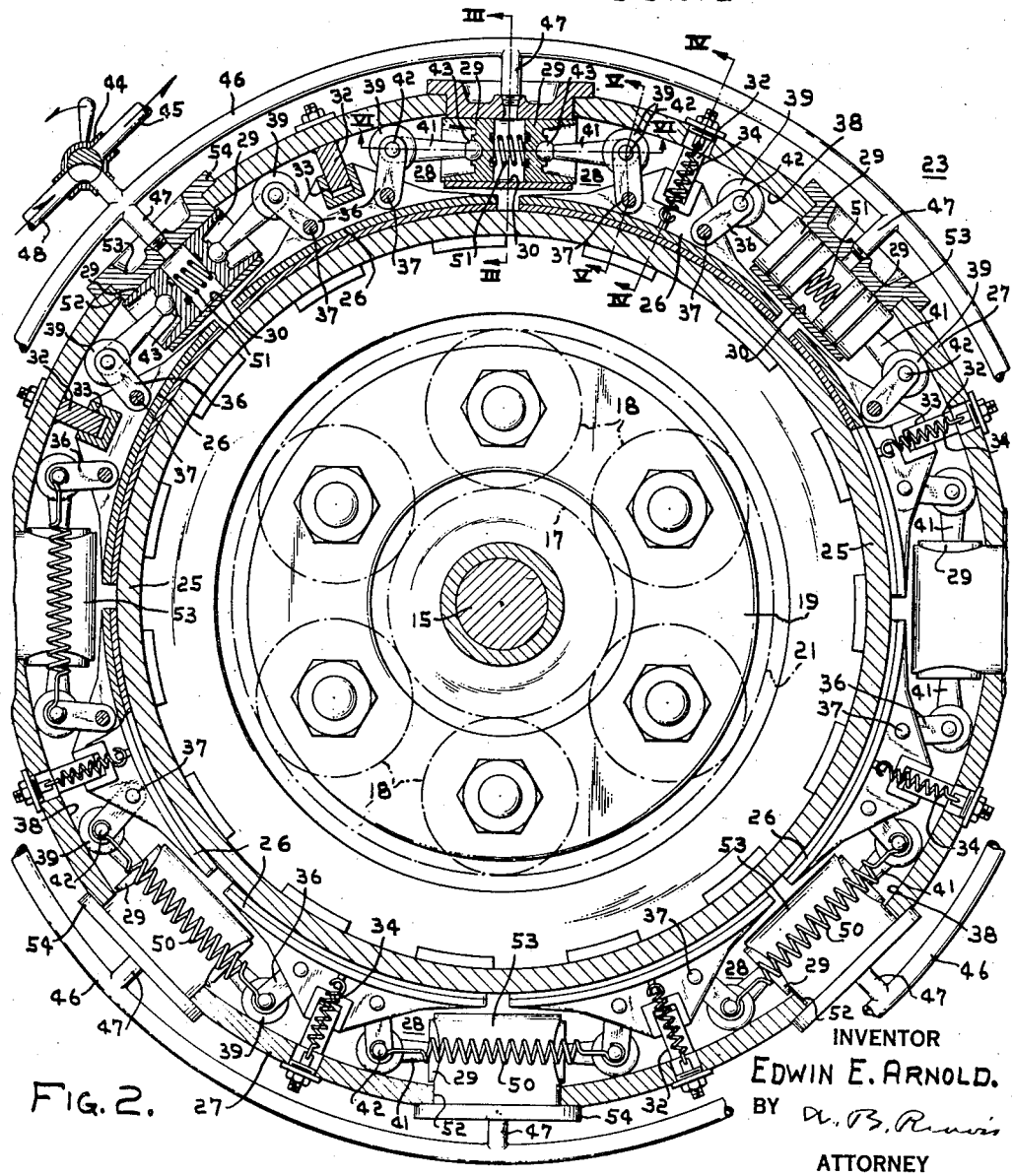
INVENTOR
EDWIN E. ARNOLD.
BY
ATTORNEY March 22, 1949. E. E. ARNOLD 2,464,960
FLUID OPERATED BRAKE
Filed July 24, 1946 2 Sheets-Sheet 2

WITNESSES:

INVENTOR
EDWIN E. ARNOLD.
BY
ATTORNEY

Patented Mar. 22, 1949

2,464,960

UNITED STATES PATENT OFFICE 2,464,960

FLUID OPERATED BRAKE

Edwin E. Arnold, Pittsburgh, Pa., assignor to Westinghouse Electric Corporation, East Pittsburgh, Pa., a corporation of Pennsylvania Application July 24, 1946, Serial No. 685,839

16 Claims. (Cl. 188—151)

The invention relates to fluid operated brakes and it has for an object to provide apparatus of this character wherein a brake drum is engageable by a plurality of brake shoes actuated by means which equalizes the braking effort thereof.

A further object of the invention is to provide a brake drum and a plurality of brake shoes cooperating therewith to effect braking for either direction of rotation and in a non-locking or non-snubbing manner together with fluid means for engaging and disengaging the shoes and operable to equalize the braking effort of the latter.

Another object of the invention is to provide a brake drum and a plurality of shoes together with fluid-pressure operated pistons and mechanisms operated by the pistons and operating the shoes with increasing mechanical advantage as the latter are engaged with the drum.

A further object of the invention is to provide a brake drum and a brake shoe carrier or casing having a plurality of brake shoes mounted thereon and provided with a cylindrical cam surface encompassing and spaced from the drum, together with toggle links pivotally connected to the shoes and being inclined to drum radii with their outer ends bearing against cylindrical cam surface so that, as the toggle links move to reduce such inclination, the shoes are engaged with the drum, and means for moving the links comprising a plurality of cylinders mounted on the carrier, pistons in the cylinders and connected to toggle links, and means for supplying fluid under pressure to the cylinders to effect equalized braking action on the part of the shoes and to exhaust fluid from the cylinders for release of the brake shoes.

Another object of the invention is to provide a circumferential series of brake shoes cooperating with a brake drum and operated by opposed pistons disposed in a circumferential series of cylinders together with means for supplying fluid under pressure in parallel to the cylinders to engage the shoes so as to develop equalized braking effort and for draining fluid from the cylinder to provide for disengagement of the shoes from the drum.

These and other objects are effected by the invention as will be apparent from the following description and claims taken in connection with the accompanying drawings, forming a part of this application, in which:

Fig. 1 is a view, partly in section and partly in elevation, showing the improved brake applied to two-speed planetary gearing of a turbine transmission;

Fig. 2 is a transverse sectional view showing component parts of the brake; and

Figure 3:
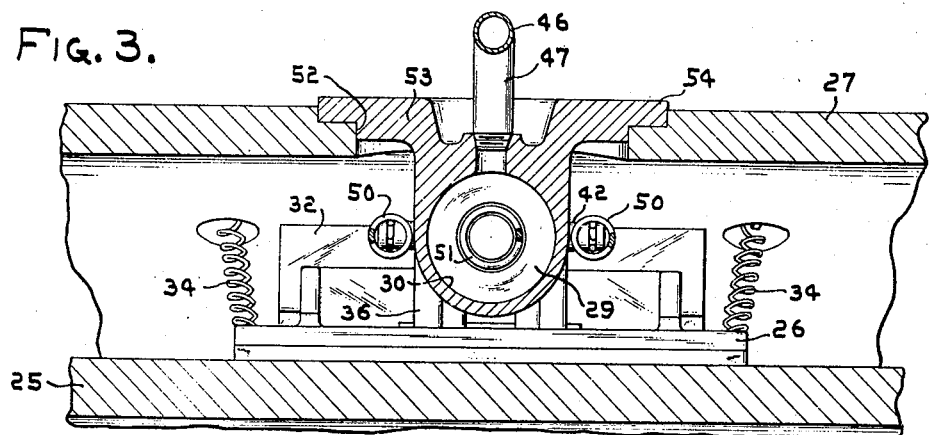
Figure 4:
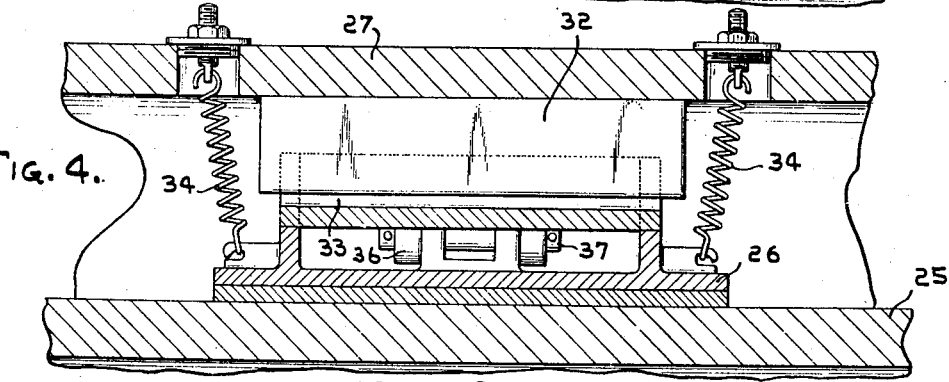
Figure 5:
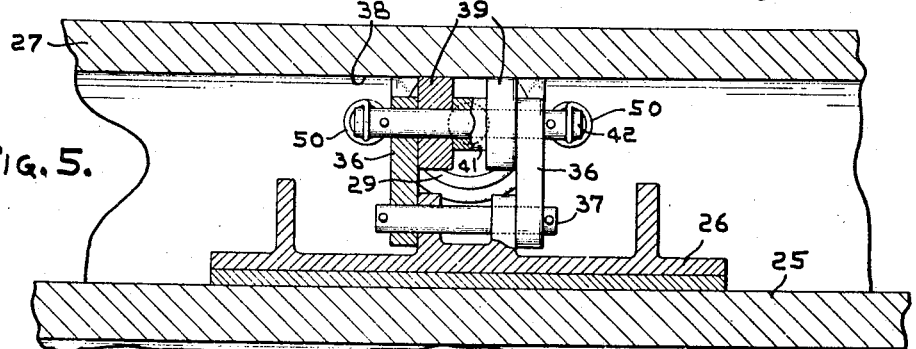
Figure 6:
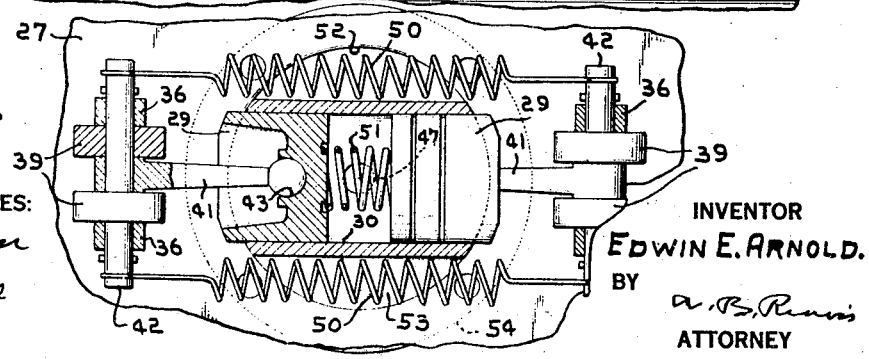

Figs. 3 to 6, inclusive, are section views taken along the lines III—III, IV—IV, V—V, and VI—VI, respectively, of Fig. 2.

In Fig. 1, illustrating an application of the novel brake, there is shown a turbine 10 having forward and reversing blading 11 and 12 for driving the rotor 14. The rotor is connected by a quill shaft 15, extending through the quill pinion 16, to the sun gear 17 meshing with planet pinions 18 rotatably mounted on the carrier 19 connected to one end of the quill pinion. The planet pinions mesh with an orbit gear 21, which is connected to the carrier by a clutch, at 22, for rotation of the quill pinion with the quill shaft, and which is restrained from rotation by the brake, at 23, the clutch being released, for rotation of the quill pinion in the same direction as the quill shaft but at less speed.

The brake, at 23, comprises a drum 25 and a series of brake shoes 26 for cooperation therewith and held against rotation with the drum by the fixed casing 27.

The shoes are moved into braking engagement with the drum by mechanisms, at 28, arranged in pairs in relation to each shoe and adjacent mechanisms of adjacent shoes are connected to opposed pistons 29—29 in the cylinders 30, mounted on the carrier or casing 27 and having their axes in a rotational plane of the drum.

The shoes are held in place circumferentially by torque-resisting lugs or blocks 32 connected to the carrier or casing 27 and fitting grooves or slots 33 formed on the shoes. The shoes are urged outwardly to released or running-clearance positions by means of the springs 34 connecting the carrier or casing 27 and the shoes.

The mechanisms, at 28, preferably are of the toggle type, they including toggle links 36 having their inner ends pivotally connected, at 37, to the shoes and having their outer ends engaging the cylindrical cam surface 38 provided on the circumferential wall of the casing 27, the outer ends of the links preferably being provided with rollers 39 for engagement with the cam surface.

Beginning at the axis of its pivot 37, each toggle link 36 is longer than the radial distance of such pivot axis from the cylindrical cam surface 38, with the result that the pair of links 36 for each shoe diverge outwardly from cam surface or drum radii passing through the toggle link pivot axes, whereby, when the links or levers of each shoe are caused to approach, the rollers thereof bear against the cam surface to push the shoe inwardly toward the drum.

The pairs of toggle links 36 are caused to approach and reduce their inclinations with respect to drum radii by means of links or rods 41 pivotally connected thereto about the roller axes 42 and having ball-and-socket connections 43 with respect to the pistons 29—29.

Considering a piston 29 and the associated toggle arrangement for transmitting motion therefrom to the corresponding brake shoe, it will be apparent that motion of the piston is larger than that imparted to the shoe and such mechanical advantage results in the braking force of the shoe being correspondingly larger than the piston force. The mechanical advantage increases as the shoe is engaged for the reason that engaging movement of the link 36 occurs with gradual reduction in the inclination thereof with respect to the drum radius.

A valve 44 having a drain passage or port 45 is operable to place the space, including the manifold 46 and the branch passages 47 connecting the latter to the cylinder spaces between the pairs of pistons, in communication with the conduit 48 communicating with a source of fluid under pressure or with the drain port 45. As all of the pistons are thereby rendered subject to the same pressure, the shoes are operated in an equalized manner, each end portion of each shoe being engaged with the drum with pressure dependent upon the force of liquid pressure exerted on the associated piston.

Springs 50 connect the toggle links 36 at adjacent end portions of adjacent shoes so that, when the brake-applying pressure is relieved, the links of each shoe are caused to recede from each other and the pistons of each pair to approach to relieve the brake-engaging pressure. A relatively light spring 51 is arranged between each pair of opposed pistons to take up for any backlash but not sufficient to cause extension of springs 34.

Preferably, the circumferential wall of the casing has openings 52 formed therein to receive the blocks 53, each of which is formed to provide a cylinder 30, the blocks being provided with flanges 54 for attachment to the circumferential wall. This construction facilitates assembly in that, with the brake shoes, toggle links, and rods in place, each block 53 may be inserted, with the spherical sockets of its pistons receiving the adjacent ball ends of the rods, and fastened to the circumferential wall or housing, the ball-and-socket connections of the pistons and rods with the springs arranged between the pistons taking up any backlash.

From the foregoing, it will be apparent that I have devised a brake which is effective in either direction and which operates, because of the shoes which are independent apart from the operating fluid pressure, in a non-snubbing or non-locking manner, that is, instead of, as in the case of a band, acting in a cumulative or building up way until locking occurs; and, as all of the shoes are subject to the same fluid pressure, the efforts thereof are equalized. As each shoe engages the drum with pressure which increases until the force required balances the force of fluid pressure acting on the associated piston, it will be apparent that minor variations in the mechanisms for each shoe are of no consequence for the reason that each shoe is moved by its pistons until the condition of force balance is attained.

While the invention has been shown in but one form, it will be obvious to those skilled in the art that it is not so limited, but is susceptible of various changes and modifications without departing from the spirit thereof.

What is claimed is:

1. In a brake, a drum, a casing encompassing the drum and being stationary in relation to the latter, a plurality of brake shoes engageable with the drum to develop braking effort for either direction of rotation of the latter, means for holding the shoes circumferentially in relation to the casing while providing for radial movement thereof, and means for engaging the shoes with and disengaging them from the drum and operative to cause the engaged shoes to exert equalized braking effort on the drum; said means comprising a plurality of cylinders carried by the casing, pistons in the cylinders, toggle mechanisms having abutment relation with respect to the casing and the shoes and acted on by the pistons in response to fluid under pressure supplied to the cylinders to engage the shoes with the drum for the exertion of braking effort on the latter, a manifold communicating with all of the cylinders, pressure supply and discharge connections, and valve means for placing the manifold in communication either with the supply connection or with the discharge connection.

2. In a brake, a drum, a casing encompassing the drum and being stationary in relation to the latter, a plurality of brake shoes, means for holding the shoes circumferentially in relation to the casing while providing for radial movement thereof, and means for engaging the shoes with and disengaging them from the drum and operative to cause the engaged shoes to exert equalized braking effort on the drum; said means comprising a plurality of cylinders carried by the casing; pistons in the cylinders; toggle mechanism in abutment relation with the casing and the brake shoes and acted upon by the pistons in response to fluid under pressure supplied to the cylinders to engage the shoes with the drum for the exertion of braking effort on the latter; a manifold communicating with all of the cylinders; pressure supply and discharge connections; valve means for placing the manifold in communication with the supply connection or with the discharge connection; and spring means effective, upon the manifold being placed in communication with the discharge connection, to move the toggle mechanisms, the pistons and the brake shoes so that the latter are clear of the drum.

3. In a brake, a drum, a structure encompassing the drum and having internal cam surfaces which extend circumferentially with respect to the drum, said structure being stationary in relation to the drum, a plurality of brake shoes, means carried by the structure for holding the shoes circumferentially while providing for radial movement thereof to engage and disengage the drum, links having their inner ends pivotally connected to the shoes and having their outer ends bearing against the cam surfaces, each link being of a length from its pivot axis to its outer end which is greater than the radial distance of such axis from the cam surface so that all of such links are inclined with respect to drum radii, a plurality of cylinders carried by said structure, pistons in the cylinders and acting on the links in response to fluid under pressure supplied to the cylinders to move the outer ends of the links circumferentially along the cam surfaces to reduce the inclination thereof with respect to drum radii and thereby to cause their inner pivoted ends and the shoes to move inwardly to engage the shoes with the drum for the exertion of braking effort on the latter, a manifold connected to the cylinders, fluid pressure supply and discharge connections, and valve means for placing the manifold in communication either with pressure supply connection or with the discharge connection.

4. In a brake, a drum; a structure encompassing the drum and having internal cam surfaces which extend circumferentially with respect to the drum; said structure being stationary in relation to the drum; a plurality of brake shoes; means carried by the structure for holding the shoes circumferentially while providing for radial movement thereof to engage and disengage the drum; links having their inner ends pivotally connected to the shoes and having their outer ends bearing against the cam surfaces; each link being of a length from its pivot axis to its outer end which is greater than the radial distance of such axis from the cam surface so that all of such links are inclined with respect to drum radii; a plurality of cylinders carried by said structure; pistons in the cylinders and acting on the links in response to fluid under pressure supplied to the cylinders to move the outer ends of the links circumferentially along the cam surfaces to reduce the inclination thereof with respect to drum radii and thereby to cause their inner pivoted ends and the shoes to move inwardly to engage the shoes with the drum for the exertion of braking effort on the latter; a manifold connected to the cylinders; fluid pressure supply and discharge connections; valve means for placing the manifold in communication with the supply connection or with the discharge connection; and spring means effective, when the manifold communicates with the discharge connection, to move the outer ends of the links and the pistons to increase the inclination of the links with respect to drum radii and to move the shoes outwardly for disengagement thereof from the drum.

5. In a brake, a drum, a casing encompassing the drum and which is stationary relative to the latter, a circular series of brake shoes for the drum, means for holding the shoes circumferentially relative to the casing, a circular series of cylinders carried by the casing and arranged alternately with respect to the shoes, said cylinders having their axes in a drum rotational plane, opposed pistons in each cylinder, mechanisms operated by the pistons to exert braking effort on adjacent portions of the shoes so that each shoe is acted upon by a pair of pistons in adjacent cylinders, means providing a common space including the cylinder spaces between the opposed pistons, fluid pressure supply and drain connections, and a valve for connecting said common space either to the supply or to the drain connection.

6. Apparatus as claimed in claim 5 with springs acting on the mechanisms to release the braking pressure of the shoes when the valve means connects said common space to the drain connection.

7. In a non-locking brake effective for either direction of rotation, a drum, a casing which is stationary relative to the drum and having an interior cylindrical surface disposed about the latter, a circular series of brake shoes for the drum, means for holding the shoes circumferentially in relation to the casing, a circular series of cylinders carried by the casing, pistons in the cylinders, toggle mechanisms operated by the pistons to exert braking effort on the shoes, each toggle mechanism including a pair of links having their outer ends pivotally connected to the associated shoe and piston and having their inner ends joined by a pivotal connection bearing against said internal surface with the shoe link inclined to a drum radius when the piston is in its inner position and whose inclination to such radius is reduced as the piston moves outwardly to urge the shoe inwardly for exertion of braking effort on the drum, means providing a common space including the cylindrical spaces to which the pistons are exposed, fluid pressure supply and drain connections, and valve means for connecting said common space either to the supply or to the drain connection.

8. In a brake, a drum, a casing which is stationary relative to the drum, a circular series of brake shoes for the drum, a circular series of cylinders carried by the casing and arranged alternately with respect to the shoes, said cylinders having their axes arranged in a rotational plane of the drum, opposed pistons in each cylinder, mechanisms operated by the pistons to exert braking effort on adjacent portions of the shoes, whereby each shoe is acted on by a pair of pistons in two adjacent cylinders, said mechanisms each operating to move the associated shoe with increasing mechanical advantage as the shoe is engaged, means providing a common space including the cylinder spaces between the opposed pistons, fluid pressure supply and drain connections, and valve means for connecting said common space either to the supply or to the drain connection.

9. In a brake, a drum, a casing which is stationary relative to the drum, a circular series of brake shoes for the drum, torque-resisting connections between the casing and the shoes and constructed and arranged to provide for movements of the shoes to engage and disengage the drum, a circular series of cylinders carried by the casing and arranged alternately with respect to the shoes, said cylinders having their axes arranged in a rotational plane of the drum, a pair of pistons in each cylinder, mechanisms operated by the pistons to exert braking effort on adjacent portions of the shoes, whereby each shoe is acted on by a pair of pistons in two adjacent cylinders, means providing a common space including the cylinder spaces between the opposed pistons, fluid pressure supply and drain connections, valve means for connecting said common space either to the supply connection or to the drain connection, springs effective to release the shoes when the valve means connects said common space to said drain connection, and springs for moving the shoes so that the latter define a desired running clearance for the drum.

10. In a brake, a drum; a circumferential series of brake shoes; a carrier for the brake shoes which is stationary relative to the drum and which has a cylindrical cam surface coaxial with the latter; pairs of toggle links pivotally connected to the respective shoes and having their outer ends bearing against the cylindrical cam surface; each of said toggle links being of greater effective length from the axis of its pivot to the cylindrical cam surface than the radial distance of the axis of the pivot from such surface and the pair of links for each shoe being positioned angularly outward of cam surface radii passing through the pivot axes of the pair of links; a circumferential series of cylinders mounted on the carrier; opposed pistons in each cylinder; rods connecting the opposed pistons of each cylinder to adjacent toggle links of adjacent shoes; means providing a common space including the spaces between the opposed pistons; fluid pressure supply and drain connections, and a valve for connecting the common space either with the fluid pressure connection or with the drain connection, whereby, when the valve is positioned to connect the fluid pressure connection to the common space, fluid supplied under pressure to the common space acts on the opposed pistons to move all of the latter outwardly to cause the toggle links to approach radial positions and in so doing to react against the cam surface to force the shoes into frictional engagement with the drum.

11. Apparatus as claimed in claim 10 with spring means for releasing the shoes when the valve means connects the common space with the drain connection.

12. In a brake, a drum, a casing which is stationary relative to the drum, said casing having a circumferential wall spaced from and encompassing the drum and which wall has an interior cylindrical cam surface coaxial with the drum, a circumferential series of brake shoes, torque-resisting means between the casing and the brake shoes and constructed and arranged to provide for movements of the latter to engage and disengage the brake drum, pairs of toggle links pivotally connected to the respective shoes and having their outer ends bearing against the cylindrical cam surface, each of said toggle links being of greater effective length from the axis of its pivot to the cam surface than the radial distance of such pivot axis from such surface and the pair of levers for each shoe being positioned angularly outward of the cam surface radii passing through the pivot axes of the pair of levers, a circular series of cylinders carried by the casing, opposed pistons in each cylinder, rods for connecting the opposed pistons of each cylinder to adjacent toggle links of adjacent shoes, means providing a common space including the spaces between the pairs of pistons, fluid pressure supply and drain connections, valve means operative to connect the common space either to the supply connection or to the drain connection, and springs for connecting adjacent toggle links to adjacent shoes and which are effective to release the latter when the valve means connects the common space to the drain connection.

13. The combination as claimed in claim 12 with springs cooperating with the shoes to move the latter to provide normal running clearance for the drum.

14. Apparatus as claimed in claim 12 wherein the circumferential wall has a circumferential series of openings and blocks providing the cylinders are inserted in the openings externally of the casing and secured in place with respect to the latter.

15. Apparatus as claimed in claim 12 wherein the pistons are formed with semi-spherical sockets and the rod ends remote from the toggle links are formed to fit the sockets and springs are interposed between the opposed pistons.

16. In a brake, a drum, a casing having an interior cylindrical surface disposed about the drum, a plurality of brake shoes cooperating with the drum, means for holding the shoes circumferentially relative to the casing, and means for engaging the shoes with and disengaging them from the drum and operative to cause the engaged shoes to exert equalized braking effort on the drum for either direction of rotation and in a non-snubbing or non-locking manner; said means comprising a plurality of cylinders, carried by the casing and having their axes in a drum rotational plane, pistons in the cylinders, toggle mechanisms for transmitting motion from the pistons to the brake shoes and operative to cause the latter to engage the drum with increasing mechanical advantage, each toggle mechanism including a pair of links having their outer ends pivotally connected to the associated shoe and piston and having their inner ends joined by a pivotal connection bearing against said interior cylindrical surface of the casing with the shoe link inclined to a drum radius when the piston is in its inner position and whose inclination to such radius is reduced as the piston moves outwardly to urge the shoe inwardly for the exertion of braking effort on the drum, a manifold connected to all of the cylinders so that the pistons are exposed to manifold pressure for operation to engage the brake shoes, fluid pressure supply and discharge connections, valve means operative to place the manifold in communication either with the supply connection or with the discharge connection, and spring means for disengaging the shoes from the drum when the cylinders are placed in communication with the discharge connection.

EDWIN E. ARNOLD.

REFERENCES CITED

The following references are of record in the file of this patent:

UNITED STATES PATENTS

| Number | Name | Date |
|---|---|---|
| 1,210,846 | Royce | Jan. 2, 1917 |
| 2,115,551 | Farmer | Apr. 26, 1938 |
| 2,174,397 | Farmer | Sept. 26, 1939 |
| 2,182,386 | Patterson | Dec. 5, 1939 |
| 2,316,414 | Goepfrich | Apr. 13, 1943 |

Certificate of Correction

Patent No. 2,464,960.                                                                                       March 22, 1949.

EDWIN E. ARNOLD

It is hereby certified that errors appear in the printed specification of the above numbered patent requiring correction as follows:

Column 4, line 48, claim 2, for the word and semi-colon "drum;" read *drum:*; column 6, line 21, claim 7, for "cylindrical" read *cylinder*; column 7, line 58, claim 12, for "to adjacent" read *of adjacent*;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*